April 14, 1970     E. A. BARTON ET AL     3,506,054
METHOD AND APPARATUS FOR BREAKING BEADS ON VEHICLE TIRES
Filed Feb. 16, 1968
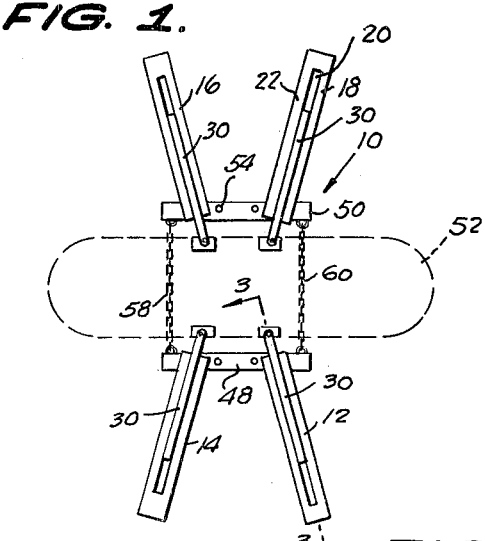
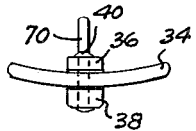
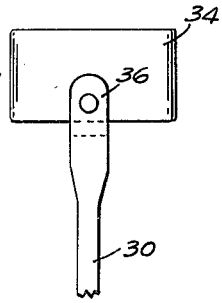
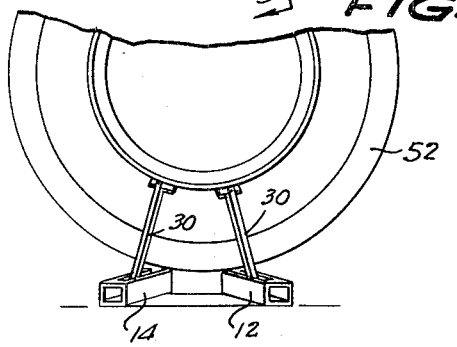
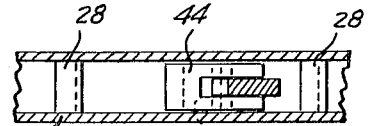
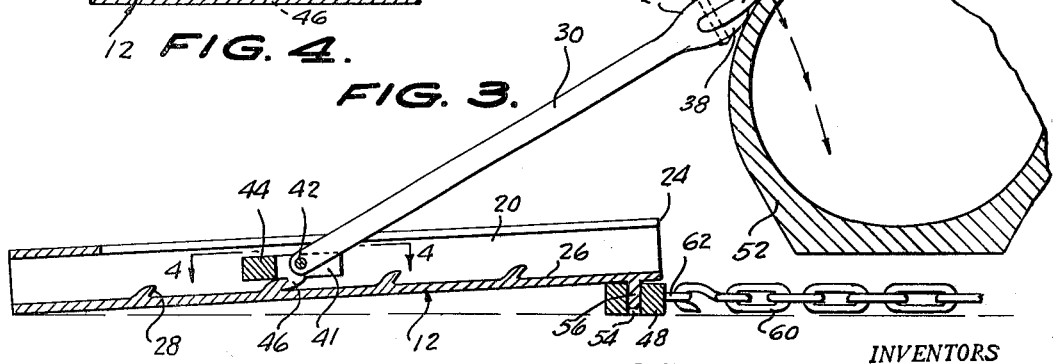
INVENTORS
EUGENE A. BARTON,
NATHANIEL W. DRAKE, JR.
BY
*Berman, Davidson & Berman*
ATTORNEYS.

United States Patent Office 3,506,054
Patented Apr. 14, 1970

3,506,054
METHOD AND APPARATUS FOR BREAKING BEADS ON VEHICLE TIRES
Eugene A. Barton, 19805 Winslow Road, Cleveland, Ohio 44122, and Nathaniel W. Drake, Jr., 4129 E. 93rd St., Cleveland, Ohio 44105
Filed Feb. 16, 1968, Ser. No. 706,089
Int. Cl. B60c 25/00, 25/04
U.S. Cl. 157—1.28                                    10 Claims

ABSTRACT OF THE DISCLOSURE

A method and apparatus for pushing a tire bead away from the rim of a vehicle wheel so it can be removed easily from the wheel. After the vehicle is raised, pairs of freely pivotal arms, locked against lateral displacement away from the tire and vehicle wheel, are inserted between the wheel rim and tire bead on opposite sides of the tire and wheel. The vehicle is then lowered and the weight thereof pivots the arms, causing them to push the tire bead away from the wheel rim.

---

This invention relates to a method and apparatus for breaking the bead on a vehicle tire so that it can be demounted easily from its wheel.

Present equipment employed to demount vehicle tires is usually located within an automotive or tire service center. If a vehicle tire goes flat, more particularly an aircraft tire or a tire on construction equipment, the entire wheel must be removed from the disabled vehicle, delivered to the service center where the tire is removed from the wheel, and repaired, and then returned to the disabled vehicle for replacement. Because of this procedure, there is a substantial loss of operating time and revenue from the disabled vehicle, if a spare tire is unavailable.

Accordingly, it is an object of this invention to provide an apparatus and method for breaking the bead between a vehicle tire and its wheel at the site of the vehicle, thereby enabling the tire to be removed, repaired, and replaced at the site, with a minimum loss of operating time.

Another object of this invention is to provide an apparatus of the character indicated which is lightweight and portable, adapted to be carried on the vehicle, and one which can be handled by a single person.

A still further object of this invention is to provide a method of the character indicated which utilizes the weight of the vehicle as the force for breaking the tire bead.

Further objects and advantages of the invention will become apparent from the following description and claims, and from the accompanying drawings, wherein:

FIGURE 1 is a top plan view of the apparatus of the present invention in position adjacent a vehicle tire;

FIGURE 2 is a fragmentary side view in elevation of the apparatus shown in FIGURE 1;

FIGURE 3 is a cross-sectional view taken substantially along the plane indicated by line 3—3 of FIGURE 1;

FIGURE 4 is a cross-sectional view taken substantially along the plane indicated by line 4—4 of FIGURE 3;

FIGURE 5 is an end view in elevation of a bead breaking arm and tool forming a portion of the apparatus illustrated in FIGURE 1; and FIGURE 6 is a fragmentary top plan view of the arm and tool shown in FIGURE 5.

Referring now to the drawing in detail, wherein like numerals indicate like elements throughout the several views, the apparatus of the present invention is generally designated by the numeral 10.

Apparatus 10 comprises four separate tubular housings 12, 14, 16, and 18, each having a longitudinal slot 20 in its top surface 22. Slot 22 opens in a forward edge 24 of top surface 22. The interior bottom surface 26 of each housing includes a series of upstanding ratchet teeth 28.

Disposed within each housing and projecting through slot 20 is an elongated pressure arm 30. End 32 of pressure arm 30 is bifurcated to receive between furcations 36 and 38 a pressure tool 34. A rivet 40, extending through each furcation and tool 34, holds the tool in place.

Tool 34 is substantially greater in width than pressure arm 30 and is arcuate in shape, as shown in FIGURE 5. The tip of tool 34 is tapered as shown in FIGURE 3.

At its opposite end, pressure arm 30 is pivotally attached to a bifurcated pawl block 44. Arm 30 is disposed in a slot 41 between the furcations on block 44, and a pin 42 carried by the block and bridging slot 41 is inserted through the end of arm 30. Pivotal movement of arm 30 is unrestrained.

Extending downwardly from pawl block 44, in meshing engagement with a preselected ratchet tooth 28, is a pawl tooth 46. Pawl tooth 46 prevents backward movement of arm 30 in its housing.

In operation, an anchor bar 48, 50 is disposed on opposite sides of a flat vehicle tire 52 connected to a wheel 53. Each bar contains a series of apertures 54. Housings 12, 14, 16 and 18 have a pin 56 projecting from their forward lower surfaces. The pins 56 on housings 12 and 14 are disposed in selected apertures 54 in bar 48, while the pins 56 on housing 16 and 18 are disposed in selected apertures 54 in bar 50.

The vehicle under repair is then raised by a conventional jack until tire 52 is off the ground. Relative lateral displacement of bars 48 and 50 is precluded by chains 58 and 60 disposed beneath tire 52. The chains are stretched and secured between lugs 62 on each bar.

Each of the arms 30 are then moved along slot 20 in each housing, and tool 34 on each arm is disposed between the rim 64 of the vehicle wheel and the bead 66 of tire 52, as shown in FIGURE 3. The vehicle with its tire 52 is then lowered until the pawl tooth 46, connected to each arm, is pushed backward into mating engagement with the nearest ratchet tooth 28 in its associated housing. Further backward movement of each arm is then precluded.

The vehicle is then lowered further. Arms 30 will pivot under the weight of the vehicle until the distance between the arms on opposite sides of tire 52 is decreased to a point where the tools 34 push against the bead of tire 52, disengaging it from rim 64 on the wheel. A projection 70 fixed to the top of furcation 36 on each pressure arm 30 prevents each tool 34 from cutting into the tire. Projection 70 will abut rim 64 after each pressure arm 30 has moved a sufficient distance to disengage the bead 66 from the rim 64.

Once the tire 52 is disengaged from the rim of wheel 53, the vehicle is raised and the wheel removed. The tire 52 can then be removed easily, repaired and replaced at the site of the vehicle.

While a specific embodiment of our invention has been disclosed in the foregoing description, it will be understood that various modifications within the spirit of the invention may occur to those skilled in the art. Therefore, it is intended that no limitations be placed on the invention except as defined by the scope of the appended claims.

We claim:
1. The method of breaking a bead between a tire and vehicle wheel comprising the steps of elevating said tire and wheel above a support surface, positioning at least one tool between the rim of said wheel and tire, and lowering said tire and wheel towards said support surface while holding said tool against lateral displacement away from said tire and vehicle wheel.

2. The method of claim 1 wherein said tire and wheel are lowered by allowing them to drop under their own weight.

3. The method of claim 2 wherein a tool is positioned between the rim of said wheel and tire on opposite sides thereof.

4. Apparatus for breaking a bead between a tire and vehicle wheel comprising support means adapted to be positioned on a support surface, arm means freely pivotal on said support means and adapted to project towards said tire and vehicle wheel, and tool means carried by one end of said arm means for insertion between the rim of said vehicle wheel and tire.

5. Apparatus for breaking a bead between a tire and vehicle wheel comprising support means adapted to be positioned on a support surface adjacent opposite sides of a tire and vehicle wheel, a pair of arm means freely pivotal on said support means and adapted to project towards opposite sides of said tire and vehicle wheel, and tool means carried by one end of each of said arm means for insertion between the rim of said vehicle wheel and tire.

6. Apparatus in accordance with claim 5 wherein said arm means are moveable linearly with respect to said support means for adjusting their distances from the tire and vehicle wheel, and means for locking said arm means in adjusted position to prevent lateral displacement away from the tire and vehicle wheel.

7. Apparatus in accordance with claim 5 wherein said support means includes a pair of tubular housing having longitudinal slots adapted to be positioned on opposite sides of the tire and vehicle wheel, means between said housings preventing displacement of said housings relative to each other, a series of ratchet teeth in the bottom of each housing, an arm means in each housing adapted to project through said slot towards said tire and vehicle wheel, and pawl means on the opposite end of each arm in mating engagement with a preselected ratchet tooth in a housing, each arm means being freely pivotal on said pawl means.

8. Apparatus in accordance with claim 7 wherein said displacement prevention means includes a bar adapted to be positioned beneath each housing, at least one aperture in each bar, a pin projecting from the undersurface of each housing receivable within the aperture in the bar therebeneath, and chain means connecting said bars.

9. Apparatus in accordance with claim 8 wherein said one end of each of said arm means is bifurcated, and said tool means includes a tool having a tapered end fixed between the furcations of each of said arm means.

10. Apparatus in accordance with claim 9 wherein the lateral dimension of said tool is greater than the lateral dimension of said arm means.

References Cited

UNITED STATES PATENTS 2,422,467   6/1947   Carroll _____ 157—1.17
3,332,467   7/1967   Clark _____ 157—1.17

GRANVILLE Y. CUSTER, Jr., Primary Examiner